United States Patent [19]
Takigawa et al.

[11] Patent Number: 5,265,088
[45] Date of Patent: Nov. 23, 1993

[54] CROSS-CONNECTION APPARATUS FOR B-ISDN

[75] Inventors: Yuji Takigawa; Masaaki Kawai; Hidetoshi Naito; Hisako Watanabe; Kazuyuki Tajima; Haruo Yamashita, all of Kawasaki, Japan

[73] Assignees: Fujitsu Limited, Kawasaki; Nippon Telegraph and Telephone Corporation, Tokyo, both of Japan

[21] Appl. No.: 889,924

[22] Filed: Jun. 2, 1992

[30] Foreign Application Priority Data
Jun. 3, 1991 [JP] Japan .................. 3-160037

[51] Int. Cl.⁵ .............................. H04J 3/26
[52] U.S. Cl. ...................... 370/15; 370/58.2; 370/60; 370/110.1
[58] Field of Search ............ 370/13, 15, 17, 58.2, 370/60, 60.1, 94.1, 94.2, 110.1; 371/20.5

[56] References Cited

U.S. PATENT DOCUMENTS 4,551,830 11/1985 Huffman ................ 370/15
5,177,736 1/1993 Tanabe et al. ........... 370/60

FOREIGN PATENT DOCUMENTS 63-283345 11/1988 Japan .

OTHER PUBLICATIONS

Sakauchi et al., "A Network Restoration Scheme for ATM Cross-connect Systems," *C&C Systems Research Labs.* NEC Corporation, CS90-60, pp. 43-48.

Primary Examiner—Douglas W. Olms
Assistant Examiner—Melvin Marcelo
Attorney, Agent, or Firm—Staas & Halsey

[57] ABSTRACT

A cross-connection apparatus for B-ISDN includes plural interface units, multiplexers, virtual path identifier (VPI) conversion tables, demultiplexers, and loop-back units and a switch unit. The interface unit has a reception port for receiving an ATM cell or inserting a monitor cell, and a transmission port for transferring the ATM cell or extracting the monitor cell; The multiplexer is operatively connected to corresponding interface unit for multiplexing the monitor cell; The VPI conversion tables is operatively connected to corresponding multiplexer for converting the VPI to change a transmission route of the monitor cell; The switch unit is operatively connected to the VPI conversion tables for switching the transmission route of the monitor cell based on the VPI; The demultiplexer is operatively connected to the switch unit for demultiplexing the monitor cell and transferring the monitor cell to the transmission port; The loop-back unit is operatively connected to corresponding interface unit for changing the transmission route so as to transfer the monitor cell to the same interface unit which the monitor cell is inserted, and as a result, the apparatus can be monitored by comparing the inserted monitor cell with the extracted monitor cell in the same interface unit.

8 Claims, 11 Drawing Sheets

VPI CONVERSION TABLE

| CROSS CONNECTION | CONNECTION | | VIRTUAL PATH |
|---|---|---|---|
| APPARATUS 1 | TL 1-VPI 1<br>TL 1-VPI 2<br>TL 1-VPI 3 | TL 5-VPI 1<br>TL 5-VPI 2<br>TL 6-VPI 1 | VP 1<br>VP 2<br>VP 3 |
| APPARATUS 2 | TL 2-VPI 1<br>TL 2-VPI 2<br>TL 2-VPI 3<br>TL 4-VPI 1<br>TL 4-VPI 2<br>TL 4-VPI 3 | TL 5-VPI 1<br>TL 7-VPI 1<br>TL 4-VPI 2<br>TL 5-VPI 2<br>TL 2-VPI 3<br>TL 7-VPI 2 | VP 1<br>VP 4<br>VP 5<br>VP 2<br>VP 5<br>VP 6 |
| APPARATUS 3 | TL 3-VPI 1<br>TL 3-VPI 2<br>TL 3-VPI 3 | TL 6-VPI 1<br>TL 7-VPI 1<br>TL 7-VPI 2 | VP 3<br>VP 4<br>VP 6 |

| | HEADER, PAYLOAD | CONTENTS |
|---|---|---|
| D1 | H | DISCRIMINATOR INDICATING OAM CELL |
| D2 | H/P | DISCRIMINATOR INDICATING LOOP-BACK CELL |
| D3 | P | DISCRIMINATOR INDICATING INSERTION POINT |
| V1 | H | VALUE TO SET INTERFACE UNIT WHICH OAM CELL IS OUT PUT |
| V2 | P | VALUE TO DESIGNATE LOOP-BACK POINT |
| V3 | P | VALUE TO OUTPUT OAM CELL TO INSERTION POINT |
| D4 | P | DISCRIMINATOR INDICATING LOOP-BACK POINT |
| DA | P | DATA FOR MONITORING ERROR RATE |

Fig. 10

| | HEADER, PAYLOAD | CONTENTS |
|---|---|---|
| D1 | H | DISCRIMINATOR INDICATING OAM CELL |
| D2 | H/P | DISCRIMINATOR INDICATING LOOP-BACK CELL |
| D3 | P | DISCRIMINATOR INDICATING INSERTION POINT |
| V1 | H | VALUE WRITTEN BY NEW OUTPUT DESIGNATING VALUE WHICH IS SET IN THE INSERTION |
| V2 | P | VALUE TO DESIGNATE LOOP-BACK POINT (=0) |
| V3 | P | THIS VALUE IS NOT CHANGED |
| D4 | P | DISCRIMINATOR INDICATING LOOP-BACK POINT |
| DA | P | DATA FOR MONITORING ERROR RATE |

Fig. 11

| | HEADER, PAYLOAD | JUDGEMENT | ESTIMATION OF ERROR PORTION |
|---|---|---|---|
| D1 | H | WHETHER IT IS OAM CELL | |
| D2 | H/P | WHETHER IT IS LOOP-BACK CELL | |
| D3 | P | WHETHER IT IS INSERTED FROM OWN INSERTION POINT | 12, 13, 10a |
| V1 | H | WHETHER NEW OUTPUT DESIGNATING VALUE AT INSERTION IS SET | 12, 20, 30 |
| V2 | P | WHETHER IT IS ZERO | 20, 30 |
| V3 | P | WHETHER IT IS CHANGED | |
| D4 | P | WHETHER IT INDICATES NEW OUTPUT DESIGNATING VALUE AND THIS DISCRIMINATOR | 12, 13, 10a |
| DA | P | WHETHER IT IS NOT CHANGED | ON THE ROUTE |

CROSS-CONNECTION APPARATUS FOR B-ISDN

BACKGROUND OF THE INVENTION

1. Field of the Invention

The present invention relates to a cross-connection apparatus for B-ISDN (Broadband-Integrated Service Digital Network), more particularly, it relates to a cross-connection apparatus having a monitor function using a monitor cell which is inserted therein and extracted therefrom.

2. Description of the Related Art

Recently, B-ISDN has been developed and widely utilized as a high speed and broadband information processing network enabling, so-called, multi media service. In general, a fixed length packet is used to transfer the information in this type of network. Further, an ATM (Asynchronous Transfer Mode) network has been developed as a technique easily realizing a B-ISDN. In the ATM network, ATM cells are used as the above fixed length packets rather than STM (Synchronous Transfer Mode) method, because the ATM cells are suitable for the control of a distributed processing since it is not necessary to perform an allocation of time slots when transferring information. Accordingly, the ATM network can easily realize the multi media service.

In this case, it is necessary to monitor an operation of the cross-connection apparatus to determine whether or not it is operating normally. Accordingly, a monitor cell is used for the above. An OAM (Operation, Administration and Maintenance) cell is used as the monitor cell in the B-ISDN as explained in detail below.

SUMMARY OF THE INVENTION

The object of the present invention is to provide a cross-connection apparatus enabling easy monitoring of an operation of the apparatus.

In accordance with the present invention, there is provided a cross-connection apparatus for B-ISDN, including:

plural interface units, each having a reception port for receiving a fixed length packet or inserting a monitor cell, and a transmission port for transferring the fixed length packet or extracting the monitor cell;

plural multiplexers, each operatively connected to corresponding interface unit for multiplexing the fixed length packet or the monitor cell;

plural virtual path identifier (VPI) conversion tables, each operatively connected to corresponding multiplexer for converting the VPI to change a transmission route of the fixed length packet or the monitor cell;

a switch unit operatively connected to the VPI conversion tables for switching the transmission route of the fixed length packet or the monitor cell based on the VPI;

plural demultiplexers operatively connected to the switch unit for demultiplexing the fixed length packet or the monitor cell and transferring these cells to the transmission port; and plural loop-back units operatively connected to corresponding interface unit for changing the transmission route so as to transfer the monitor cell to the same interface unit which said monitor cell is inserted, and as a result, the apparatus being monitored by comparing the inserted monitor cell with the extracted monitor cell in the same interface unit.

In a preferred embodiment, the fixed length packet is an ATM (Asynchronous Transfer Mode) cell.

In a preferred embodiment, the monitor cell is an OAM cell including a header area and a payload area, the header area having information of the VPI and the transmission route, and the payload area having loop-back information written at insertion to the reception port and rewritten in the loop-back unit.

In a preferred embodiment, the loop-back unit is further provided between the multiplexer and the demultiplexer so as to bypass the VPI conversion table and the switch unit.

In a preferred embodiment, the loop-back unit includes: four input/output ports, i.e., two input ports and two output ports; an extraction unit receiving the monitor cell from the input port 2 and extracting the monitor cell to be loop-backed; and a write unit operatively connected to the extraction unit to receive the monitor cell to be loop-backed for writing an information of a passage point of the monitor cell on the transmission route and outputting the information to the output port 1.

In a preferred embodiment, the extraction unit includes: a detection unit connected to the input port 2 for detecting the monitor cell and extracting counter values indicating numbers passed through the loop-back means, i.e., passage counter values; an update unit receiving the passage counter values to update them and generating two kinds of control signals to switch the transmission route; an insertion unit for inserting the updated passage counter values into the monitor cell based on the control signal S1; and a switch unit for switching the transmission route of the monitor cell between the output port 2 and the loop-back port based on the control signal S2.

In a preferred embodiment, the header area includes an OAM cell discriminator for defining the OAM cell, a loop-back cell discriminator for defining the loop-back, and an output designating value for designating an address of the interface unit outputting the OAM cell.

In a preferred embodiment, the payload area includes an insertion point discrimination for recording the discriminator of the insertion point; a passage counter value for designating the number of the loop-back unit i.e., loop-back point, to perform loop-back operation; a new output designating value set so as to output to the insertion point of the OAM cell, and copied to the output designating value of the header area in the first loop-back unit; a loop-back point discriminator for indicating a space to insert the discriminator of the loop-back unit which has already performed loop-back operation; and data for monitoring error rate.

DESCRIPTION OF THE PREFERRED EMBODIMENTS

Before describing preferred embodiments, a conventional art will be explained in detail below.

Figure 1:
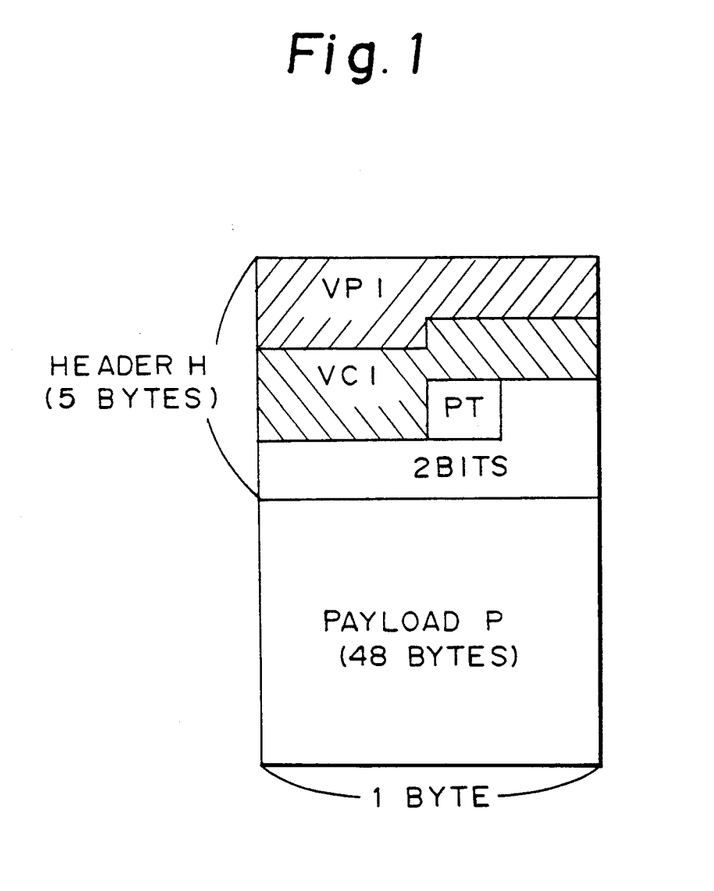
FIG. 1 shows a basic structure of an ATM cell.

FIG. 1 shows the basic structure of an ATM cell. Basically, the ATM cell is formed by a header area H having five bytes and a payload area P having forty-eight bytes. The header area H is formed by a virtual path identifier area VPI having twelve bits for identifying a virtual path VP, a virtual channel identifier area VCI for identifying a virtual channel, a payload type area PT for identifying a monitor cell, and remainder area.

Figure 2:
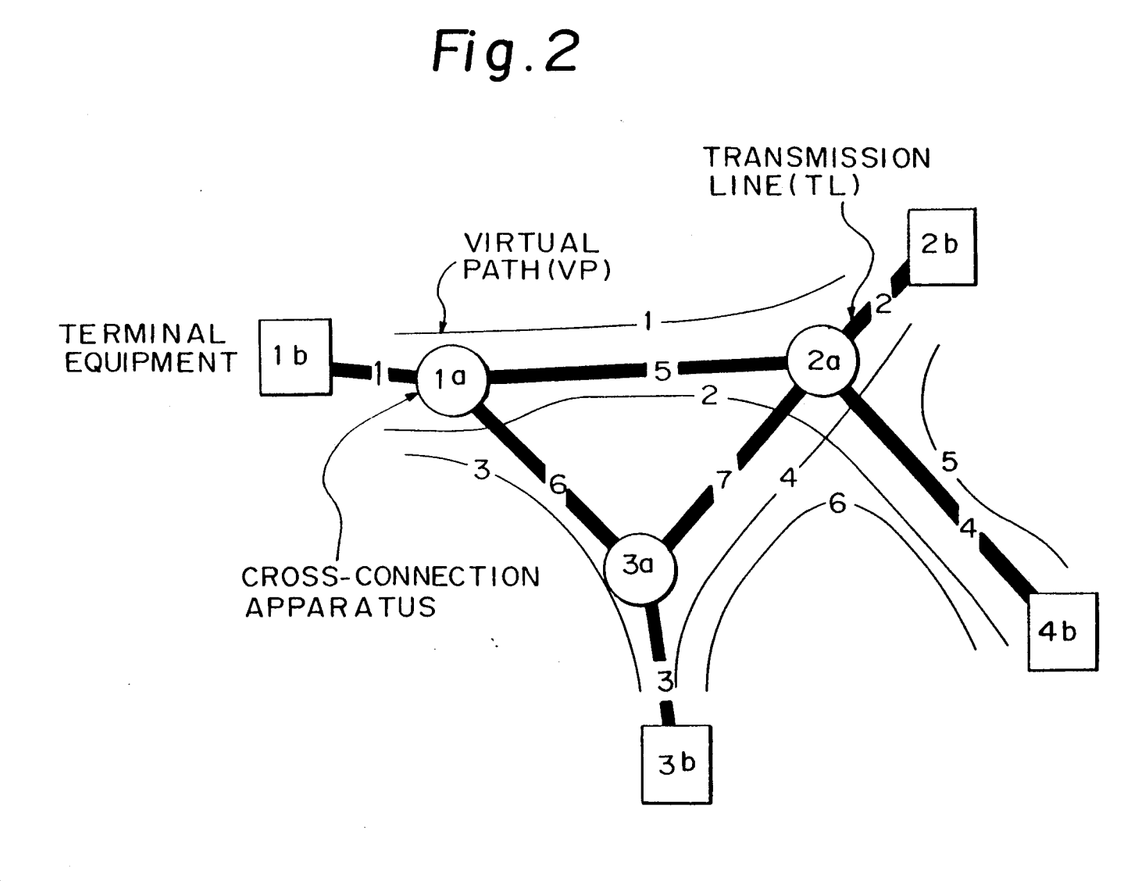
FIG. 2 shows one example of an ATM network.

FIG. 2 shows one example of an ATM network. In the drawing, reference numbers 1a to 3a denote cross-connection apparatuses, and 1b to 4b denote terminal equipments. Further, thin lines denote virtual paths (VP), and thick lines denote high speed transmission lines (TL) connecting between cross-connection apparatuses. Each of terminal equipments 1b to 4b is connected to a corresponding cross-connecting apparatus through the high speed transmission line TL. Further, the virtual path VP is provided for indicating the allocation of high speed transmission lines between any two terminal equipments. Accordingly, the virtual path identifier VPI shown in FIG. 1 is used to identify the virtual path VP.

Figure 3:
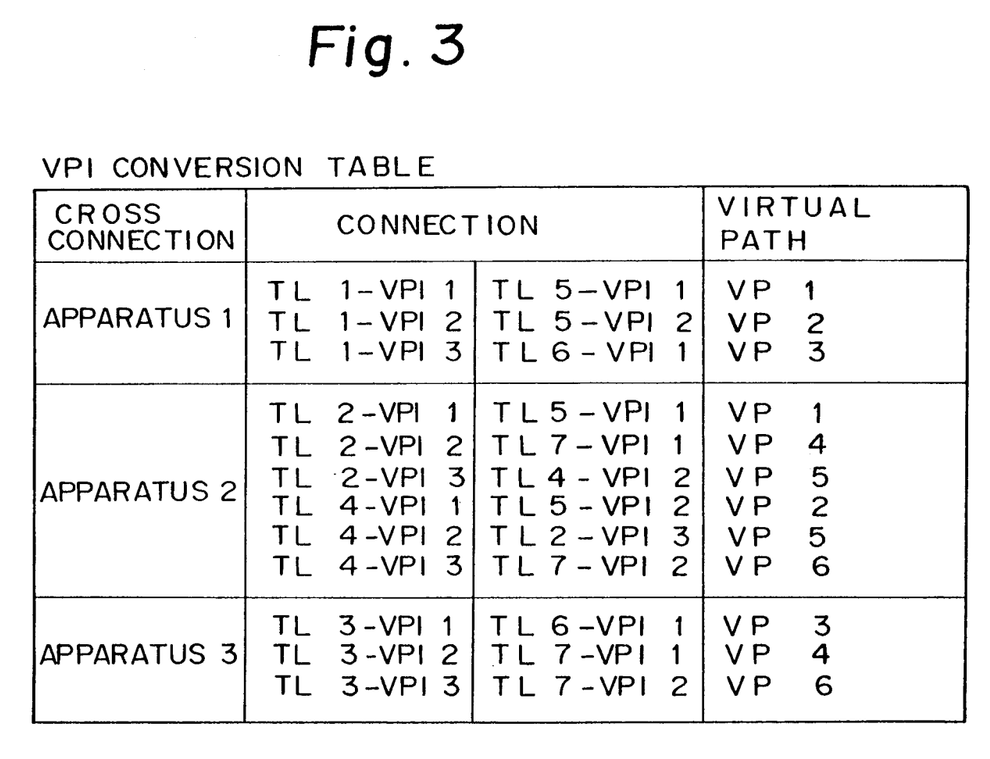
FIG. 3 shows a VPI conversion table provided in a cross-connection apparatus.

FIG. 3 shows a VPI conversion table provided in the cross-connection apparatus. In this table, a virtual path identifier VPI is individually set to each transmission line TL in each cross-connection apparatus, and the connection relationship between the transmission line and the virtual path identifier VPI is set to the corresponding virtual path VP. Accordingly, the transmission route of the ATM cell and the monitor cell is selected in the cross-connection apparatus based on the virtual path identifier VPI.

Further, a monitor cell is provided in the payload type area PT in the header area H shown in FIG. 1 to periodically monitor the transfer state of the ATM cell in the cross-connection apparatus to determine whether or not it is transferred normally through the virtual path VP. As mentioned above, in general, an OAM cell is used as a monitor cell in the ATM network.

Accordingly, it is preferable to effectively utilize the OAM cell so as not to reduce the transmission performance in the cross-connection apparatus.

Figure 4:
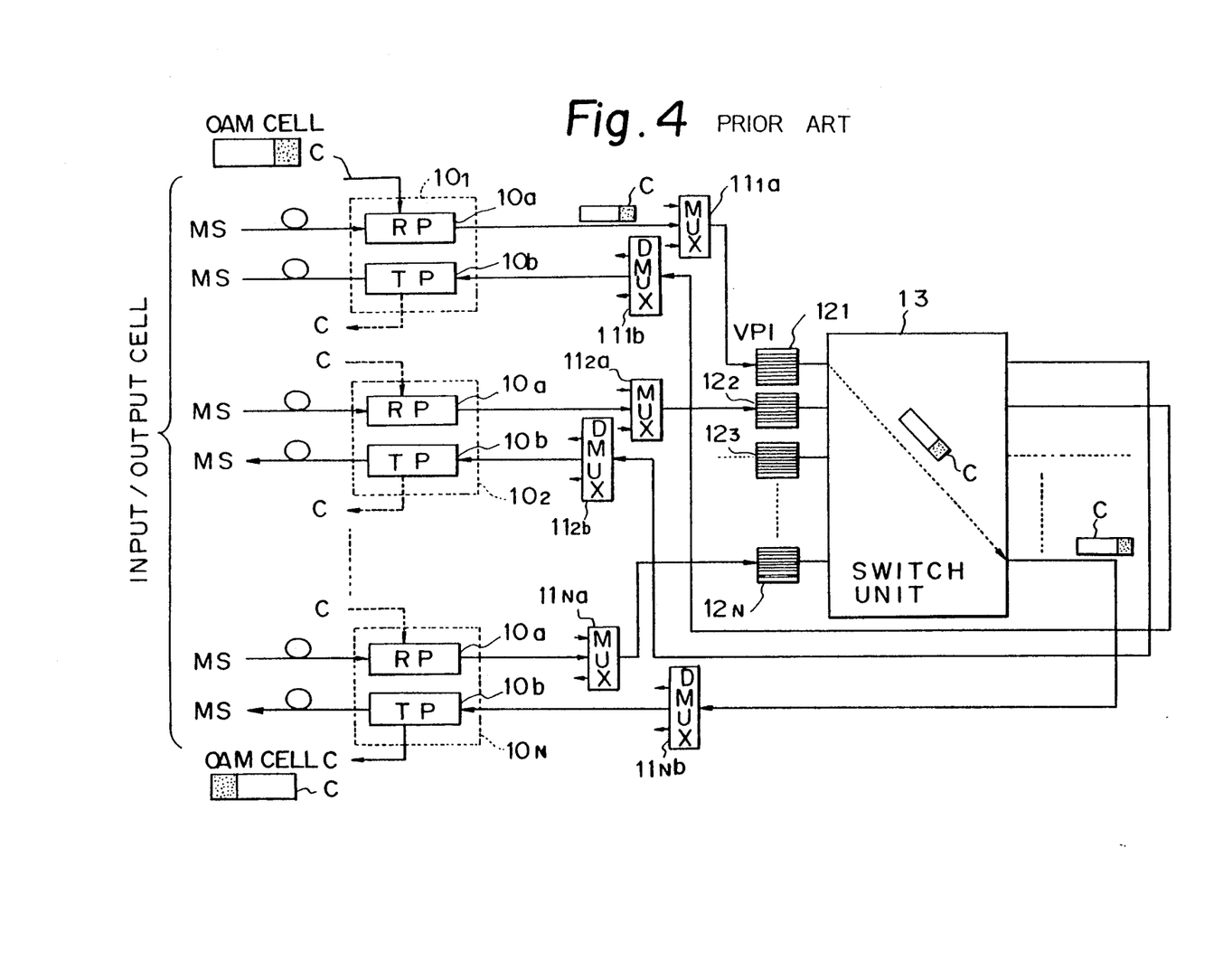
FIG. 4 is a schematic block diagram for explaining the transfer of an ATM cell and an OAM cell in a conventional cross-connection apparatus for an ATM network.

FIG. 4 is a schematic block diagram for explaining the transfer of the ATM cell and the OAM cell in a conventional cross-connection apparatus for the ATM network. In the drawing, reference numbers 10-1 to 10-N denote interface units each having a reception port (RP) 10a and a transmission port (TP) 10b. The reception port 10a receives the ATM cell as a main signal (MS) and periodically inserts the OAM cell C. The transmission port 10b transfers the ATM cell as a main signal (MS) and extracts the OAM cell C.

Reference numbers 11-1a, 11-2a and 11-Na denote multiplexers (MUXs) each multiplexing the ATM cell or the OAM cell. Reference numbers 11-1b, 11-2b and 11-Nb denote demultiplexers (DMUXs) each demultiplexing the multiplexed ATM cell or the OAM cell.

Reference numbers 12-1 to 12-N denote VPI conversion tables each converting the VPI of the header area H of the OAM cell into the VPI for the next transmission route.

Reference number 13 denotes a switch unit for switching the transmission route based on the converted VPI of the header area H of the OAM cell.

As shown in the drawing, the OAM cell is inserted to the reception port 10a of the interface 10-1, transferred to the multiplexer 11-1a, transferred to the switch unit 13 after conversion of the VPI in the VPI conversion table, transferred to the demultiplexer 11-Nb, and finally, transferred to the transmission port 10b of the interface 10-N and output therefrom.

Figure 5A:
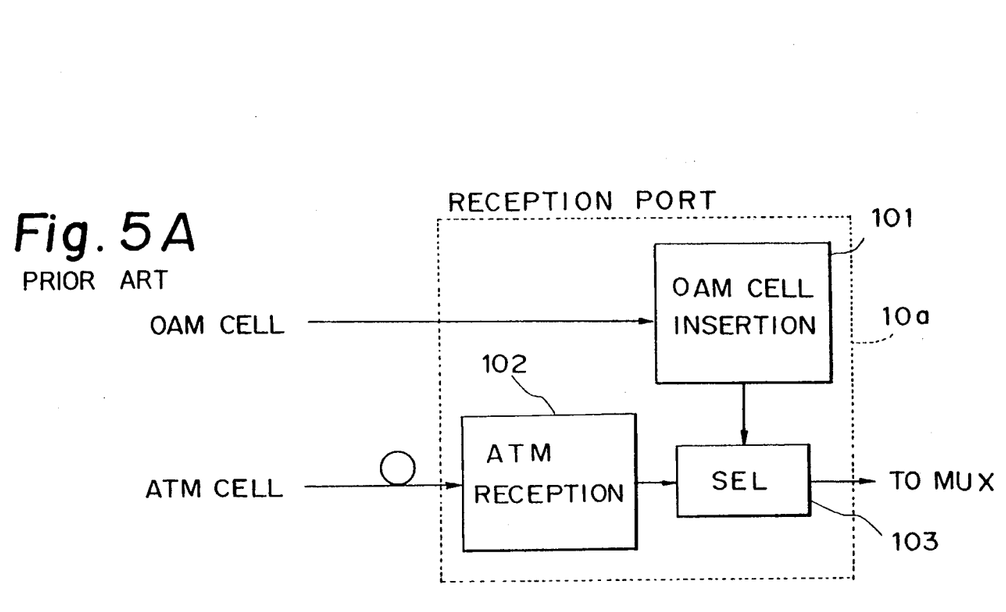
FIG. 5A is a detailed block diagram of a reception port shown in FIG. 4.
Figure 5B:
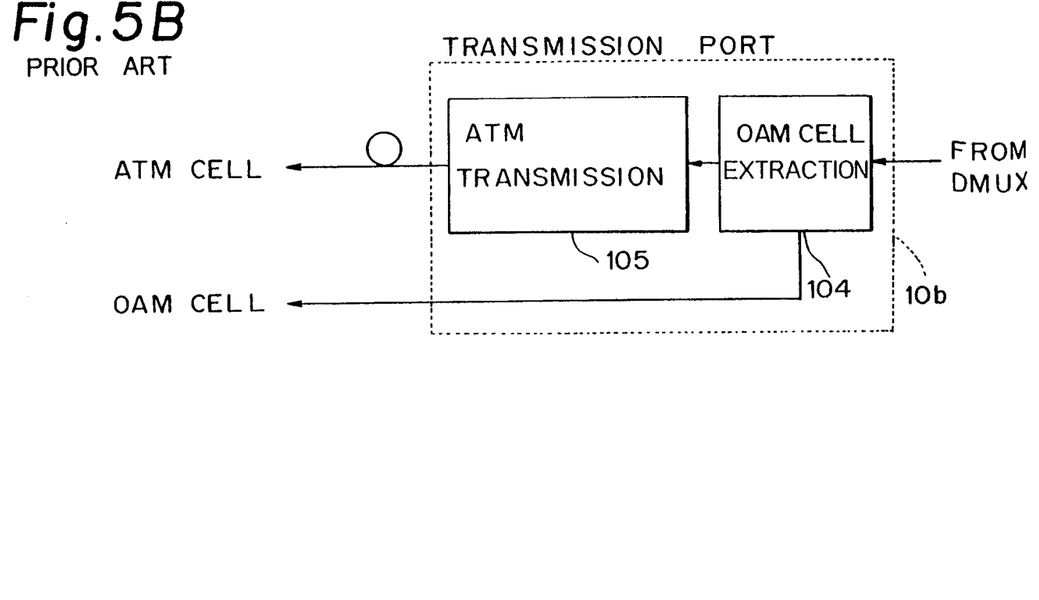
FIG. 5B is a detailed block diagram of a transmission port shown in FIG. 4.

FIGS. 5A and 5B are detailed block diagrams of the reception port and the transmission port shown in FIG. 4. FIG. 5A denotes the reception port, and FIG. 5B denotes the transmission port. In the reception port 10a, reference number 101 denotes a monitor cell insertion unit for inserting the OAM cell when monitoring the apparatus, 102 denotes an ATM receiving/processing unit for receiving the ATM cell from the other cross-connection apparatus, and 103 denotes a selection unit (SEL) for selecting between the ATM cell and the OAM cell. In the transmission port 10b, reference number 104 denotes a monitor cell extraction unit for extracting the OAM cell when it is transferred from the demultiplexer DMUX and outputting the OAM cell, and 105 denotes an ATM transmitting/processing unit.

When checking the cross-connection apparatuses, the OAM cell is inserted to the monitor cell insertion unit 101 of the reception port 10a from the terminal equipment. When inserting the OAM cell, it is multiplexed by the multiplexer MUX and transferred to the switch unit 13 after conversion of the VPI in the VPI conversion table. Further, the OAM cell is input from the demultiplexer DMUX to the monitor cell extracting unit 104 so that the OAM cell is extracted.

In the conventional art, as shown in FIG. 4, the interface unit into which the OAM is periodically inserted to monitor the apparatus is different from the interface unit which the OAM cell is extracted. That is, the OAM cell is inserted into the interface unit 10a, and is extracted from the interface unit 10N. Accordingly, it is necessary to monitor the OAM cell for two interface units so that the monitor step becomes complex and much time is required to monitor the cross-connection apparatus.

The feature of the present invention is to provide a cross-connection apparatus enabling easy monitoring of the apparatus in such a way that the same monitor cell is inserted into and extracted from the same interface unit.

Figure 6:
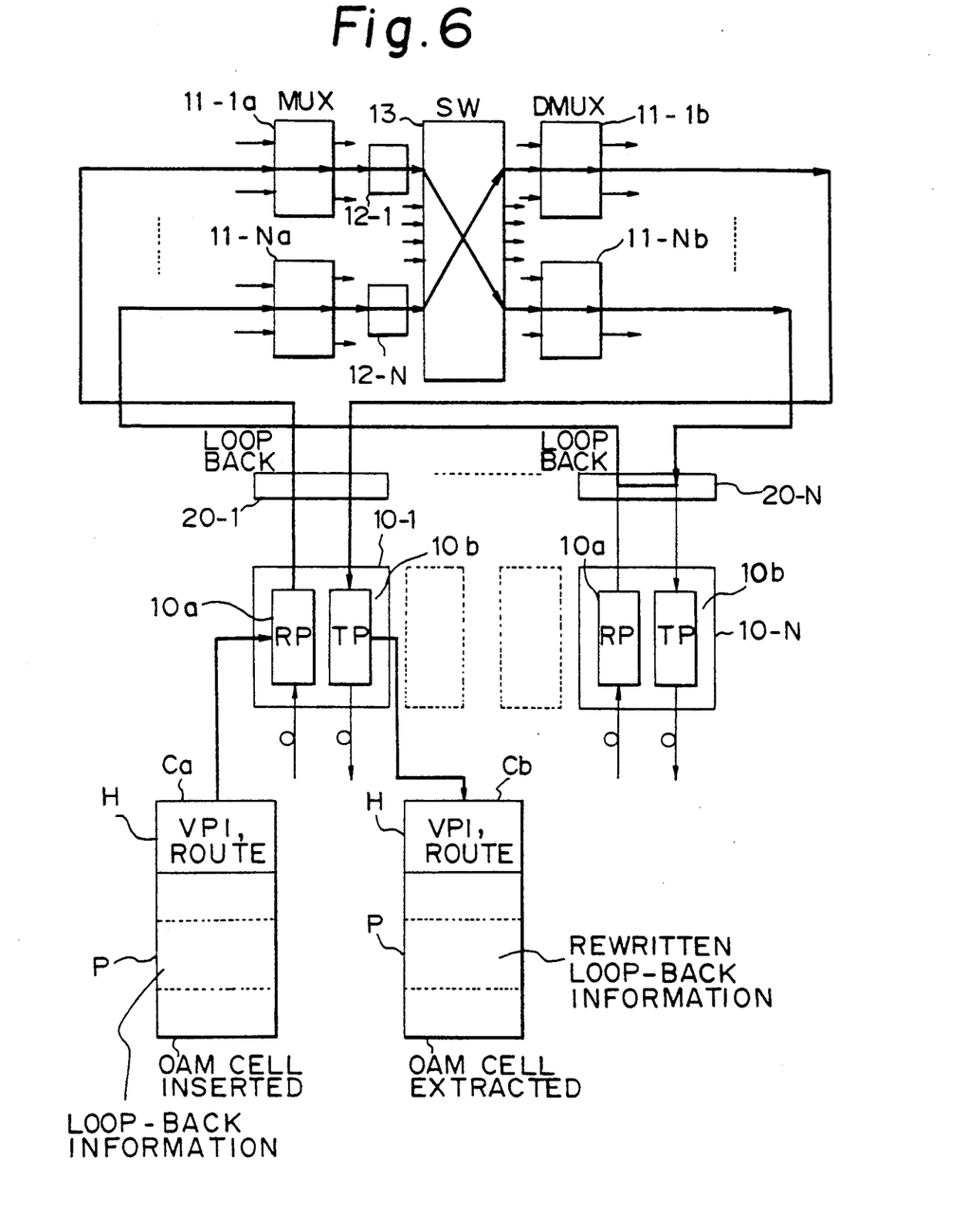
FIG. 6 is a schematic block diagram of a cross-connection apparatus according to an embodiment of the present invention.

FIG. 6 is a schematic block diagram of a cross-connection apparatus according to an embodiment of the present invention. In the drawing, reference numbers 10a to 10N denote interface units, 11-1a to 11-Na denote multiplexers, 11-1b to 11-Nb denote demultiplexers, 12-1 to 12-N denote VPI conversion tables, 13 denotes switch unit, and 20-1 to 20-N denote loop-back units. As shown in the drawing, each loop-back unit 20-1 to 20-N is provided for each corresponding interface units 10-1 to 10-N.

In the above structure, the OAM cell to be inserted (below, OAM cell Ca) is input to the reception port 10a, and the OAM cell to be extracted (below, OAM cell Cb) is output from the transmission unit 10b in the same interface unit. The OAM cell has information for the VPI and the transmission route in the header area H, and the information for the loop-back route in the payload area P.

When the OAM cell Ca is inserted into the reception port 10a of the interface 10-1, the OAM cell Ca is transferred to the multiplexer 11-1a through the loop-back unit 20-1. Further, the OAM cell is transferred to the switch unit 13 through the VPI conversion table 12-1. The route of the OAM cell Ca is changed to the other route in the switch unit 13 based on the VPI conversion table 12-1.

Further, the OAM cell Ca is transferred to the loop-back unit 20-N through the demultiplexer 11-Nb. The loop-back unit 20-N performs a loop-back operation after rewriting the loop-back information of the payload area P as explained in detail herein after, and generates a rewritten OAM cell Cb. Accordingly, when the OAM cell Ca reaches to the loop-back unit 20-N, a new OAM cell Cb, for which loop-back information is rewritten, is transferred from the interface unit 20-N to the multiplexer 11-Na. That is, the OAM cell is not transferred to the interface unit 10-N.

Accordingly, the OAM cell Cb is transferred from the interface unit 10-N to the multiplexer 11-Na, and transferred to the switch unit 13 through the VPI conversion table 12-N, which performs a further VPI conversion. Then, the transmission route of the OAM cell Cb is changed by the switch unit 13, and transferred to the loop-back unit 20-1 through the demultiplexer 11-1b. Finally, the OAM cell Cb is transferred to the transmission port 10b of the same interface unit 10-1 into which the OAM cell is inserted and the OAM cell Cb is extracted therefrom.

As explained above, the loop-back information of the OAM cell Ca is rewritten by the loop-back unit 20-N so that the OAM cell Ca becomes the OAM cell Cb having the rewritten loop-back information. Accordingly, the original loop-back information of the OAM cell Ca is compared with the rewritten loop-back information of the OAM cell Cb so that it is possible to determine whether or not the cross-connection apparatus is operating normally.

Figure 7:
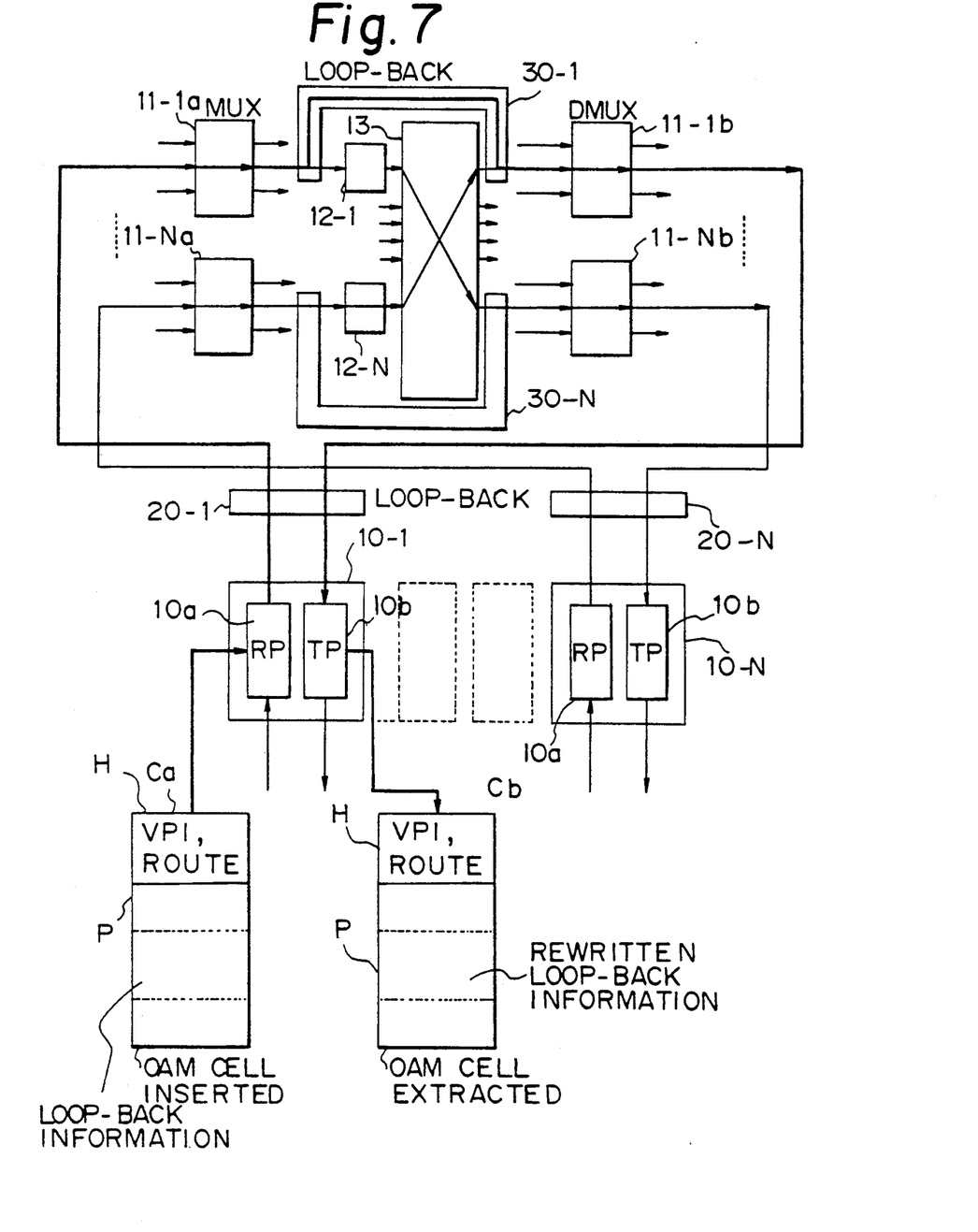
FIG. 7 is a schematic block diagram of a cross-connection apparatus according to another embodiment of the present invention.

FIG. 7 is a schematic block diagram of a cross-connection apparatus according to another embodiment of the present invention. In the drawing, the same reference numbers as used in FIG. 6 are attached to the same components in this drawing. Reference numbers 30-1 and 30-N denote loop-back units in addition to the loop-back units 20-1 and 20-N. As shown in the drawing, a plurality of the loop-back units 20-1 to 20-N and 30-1 to 30-N are provided in the transmission route.

That is, the loop-back unit 30-1 directly connects the multiplexer 11-1a and the demultiplexer 11-1b so as to bypass the VPI conversion table 12-1 and the switch unit 13. Accordingly, the VPI conversion table 12-1 is not used for converting the transmission route. In this case, the loop-back units 20-1 to 20-N are not used for a loop-back operation. The OAM cell Ca is inserted into the reception port 10a of the interface unit 10-1 and transferred to the multiplexer 11-1a through the loop-back unit 20-1. Further, the OAM cell is transferred to the demultiplexer 11-1b through the loop-back unit 30-1, then, the OAM cell is transferred to the transmission port 10b of the same interface unit 10-1 through the same loop-back unit 20-1.

Accordingly, it is possible to monitor the operation of the cross-connection apparatus by using the same interface unit based on the loop-back information.

Figure 9:
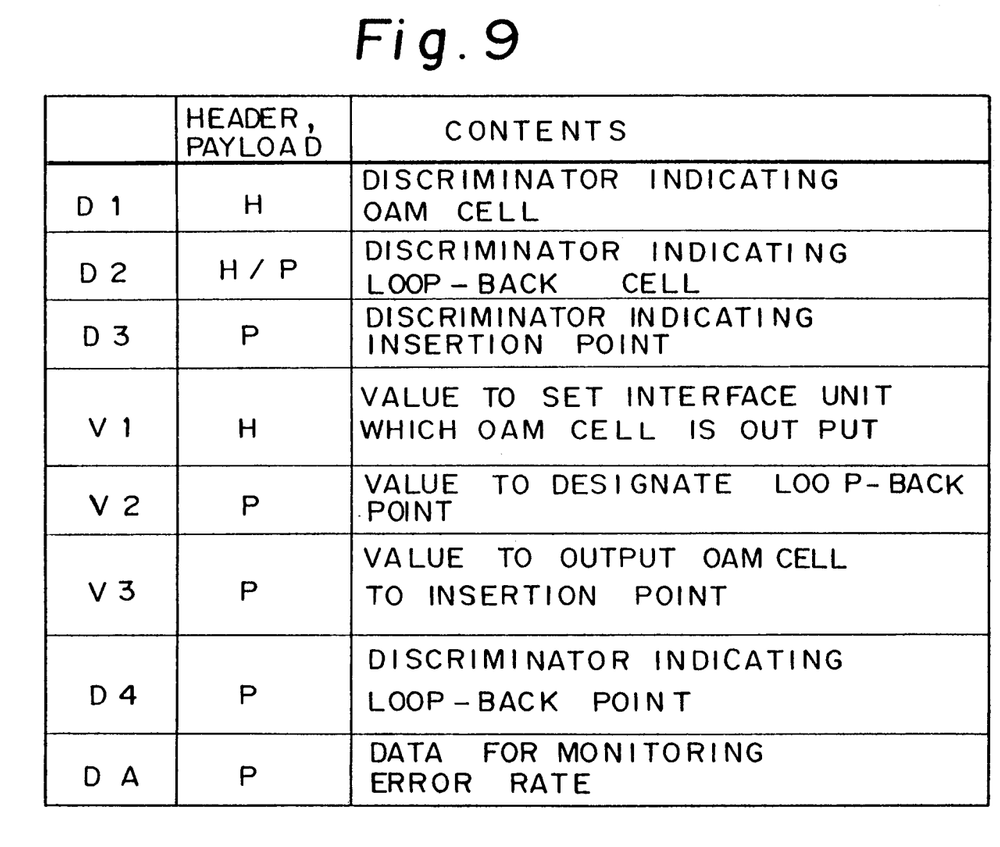
FIG. 9 shows loop-back information of the OAM cell when it is inserted to the reception port of the interface unit shown in FIGS. 6 and 7.
Figure 10:
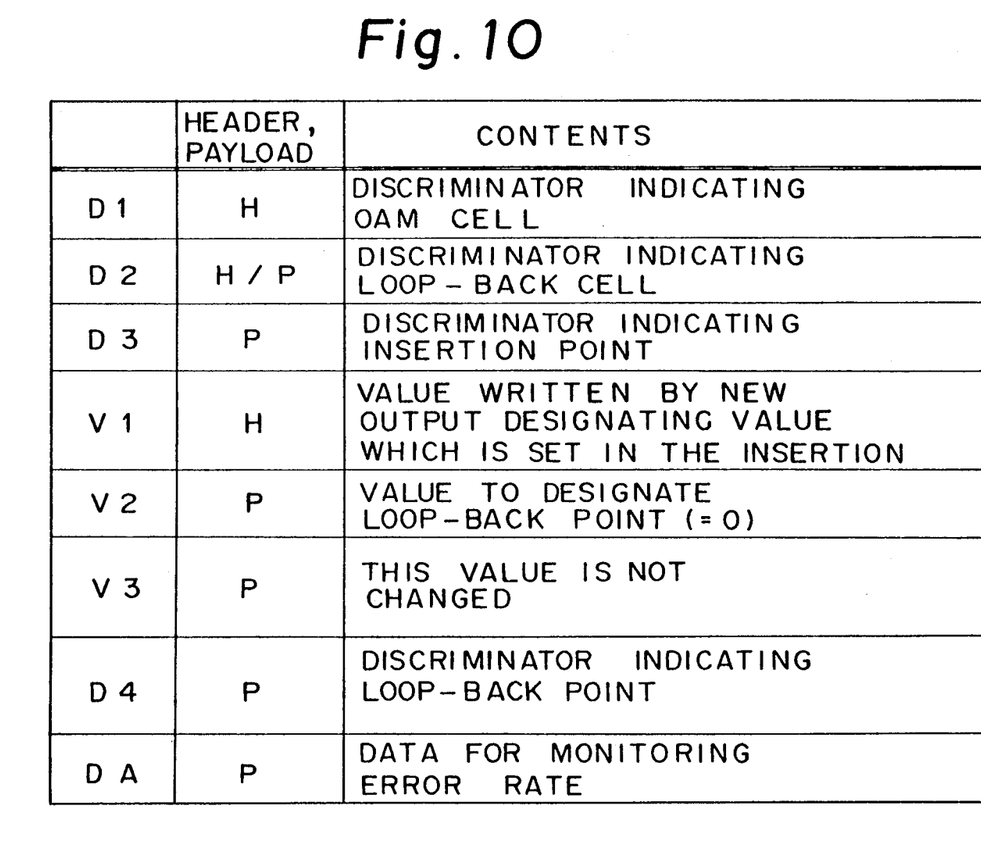
FIG. 10 shows loop-back information of the OAM cell when it is extracted from the transmission port of the interface unit shown in FIGS. 6 and 7.
Figure 11:
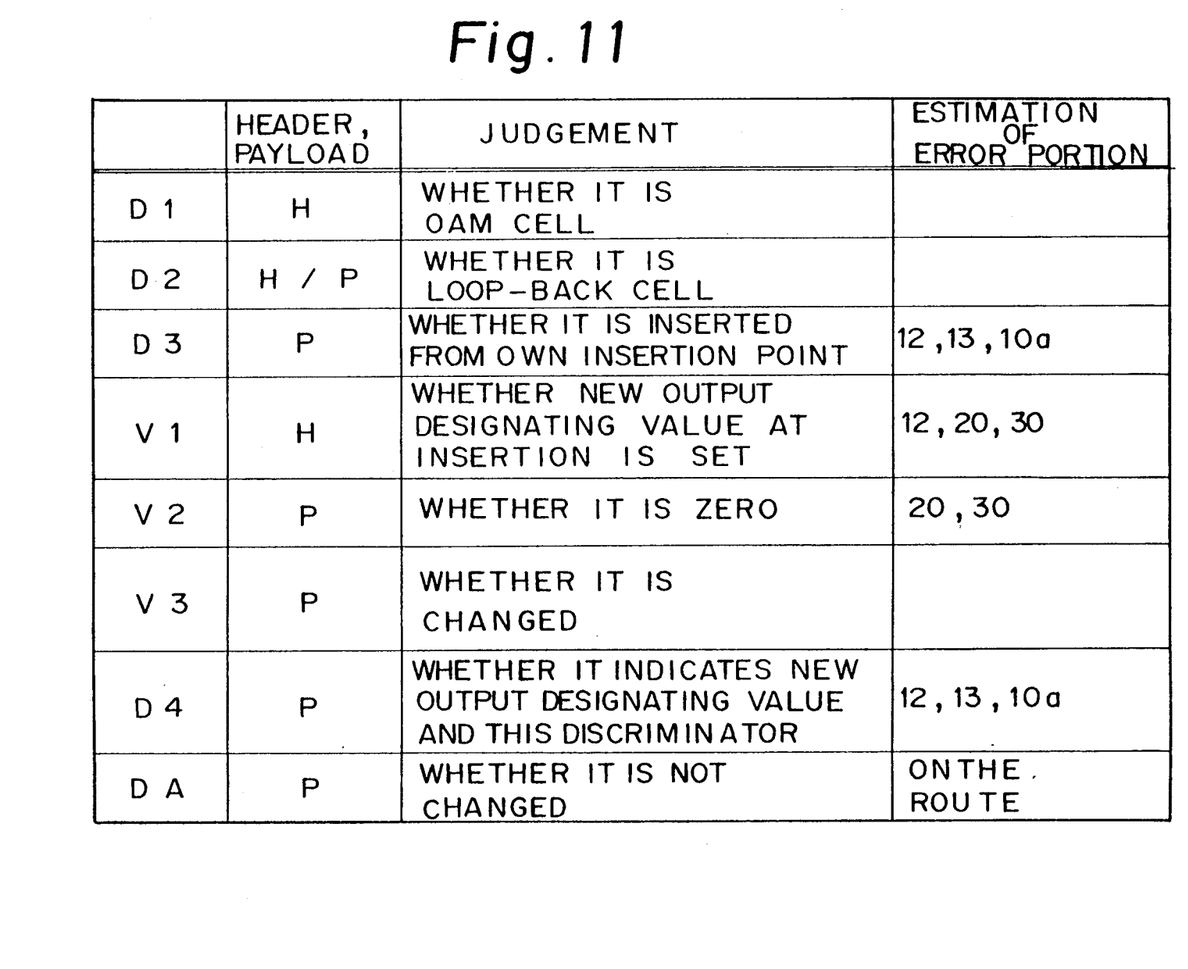
FIG. 11 shows data of the OAM cell for judging a failure of the cross-connection apparatus according to the present invention.

In this case, additional information which indicates the number of the loop-back unit to be loop-back is set to the loop-back information area in the payload area P as explained in detail in FIGS. 9 to 11.

Figure 8A:
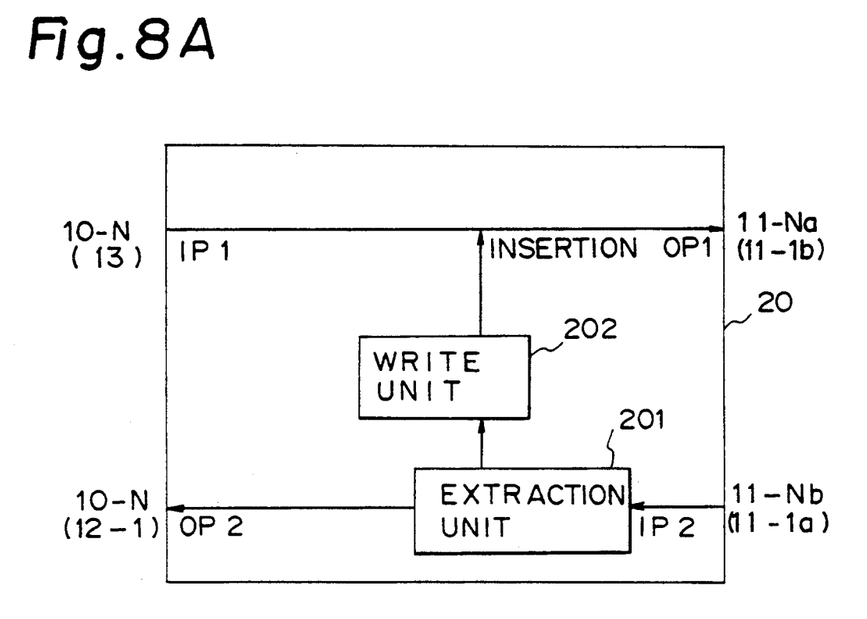
FIG. 8A is a detailed structure of a loop-back unit shown in FIGS. 7 and 8.
Figure 8B:
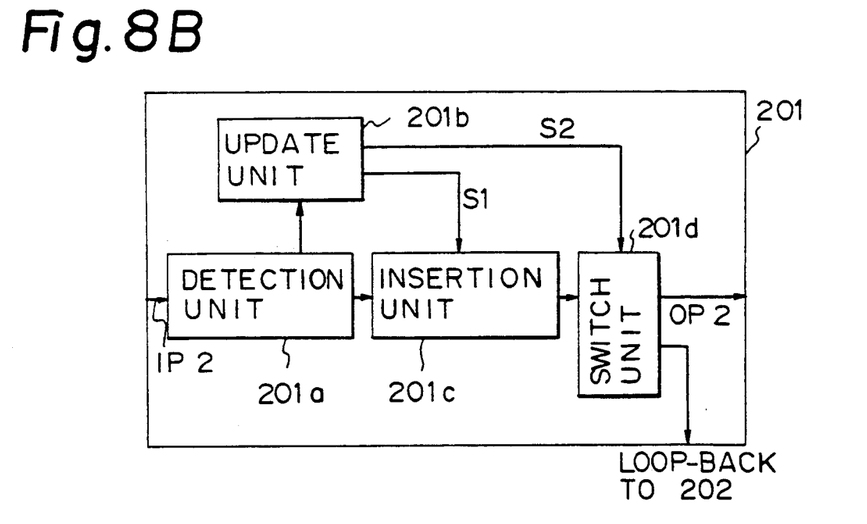
FIG. 8B is a detailed structure of an extraction unit in FIG. 8A.

FIG. 8A is a detailed structure of the loop-back unit shown in FIGS. 7 and 8, and FIG. 8B is a detailed structure of an extraction unit in FIG. 8A. As shown in FIG. 8A, the loop-back unit is formed by four input/output ports, i.e., two input ports IP1 and IP2 and two output ports OP1 and OP2; an extraction unit 201 receiving the monitor cell from the input port 2 and extracting the monitor cell to be loop-backed; and write unit 202 operatively connected to the extraction unit to receive the monitor cell to be loop-backed for writing information of the passage point of the monitor cell on the transmission route and outputting the information to the output port 1.

Further, as shown in FIG. 8B, the extraction unit 201 is formed by a detection unit 201a connected to the input port 2 for detecting the monitor cell and extracting counter values indicating the numbers passed through the loop-back means, i.e., passage counter values; an update unit 201b receiving the passage counter values to update them and generating two kinds of control signals S1 and S2 to switch the transmission route; an insertion unit 201c for inserting the updated passage counter values into the monitor cell based on the control signal S1; and a switch unit 201d for switching the transmission route of the monitor cell between the output port 2 and the loop-back port based on the control signal S2.

The operation of the above loop-back unit is explained in detail hereinafter with reference to FIGS. 9 to 11 which show the content of data in the OAM cell.

FIG. 9 shows loop-back information of the OAM cell when it is inserted into the reception port of the interface unit 10-1 shown in FIGS. 6 and 7. In FIG. 9, "H" denotes the header area of the OAM cell, and "P" denotes the payload area of the OAM cell as mentioned above.

The header area H includes an OAM cell discriminator D1 for defining the OAM cell, a loop-back cell discriminator D2 for defining the loop-back cell, and an output designating value V1 (i.e., VPI etc) for designating an address of the interface unit outputting the OAM cell. The loop-back cell discriminator D2 is also included in the payload area P.

The payload area P includes an insertion point discriminator D3 for recording the discrimination number of the insertion point (interface unit to be inserted); a passage counter value V2 for designating a loop-back unit number to perform a loop-back operation (i.e., a loop-back point); a new output designating value V3

(i.e., VPI) set so as to output to the insertion point of the OAM cell, and this value is copied to the output designating value V1 of the header area H in the first loop-back unit; a loop-back point discriminator D4 for indicating a space to insert the discriminator of the loop-back unit which has already performed the loop-back operation; and data DA for monitoring error rate, for example, a pseudo noise (PN) pattern.

In this case, new output designating value V3 is set as a new value in the loop-back unit which performs the loop-back operation, and this value V3 is copied to the header area H after loop-back operation. Accordingly, since this new value V3 does not have an effective value for the loop-back point discriminator D4 in the same timing, it is possible to hold this new value V3 and the loop-back point discriminator D4 in the same area.

When the OAM cell is inserted into the reception port 10a of the interface unit 10-1 shown in FIG. 6, the OAM cell is transferred to the multiplexer 11-1a through the loop-back unit 20-1. This corresponds to the thick line from the input port 1 (IP1) to the output port 1 (OP1) in FIG. 8A. When the OAM cell is transferred to the VPI conversion table 12-1 through the multiplexer 11-1a, the output port number of the switch unit 13 is determined based on the output designating value V1 shown in FIG. 9. Then, the OAM cell is transferred from the output port of the switch unit 13, which is determined by the output designating value V1, to the loop-back unit 20-N through the demultiplexer 11-Nb.

In the loop-back unit 20-N, the OAM cell is input from the input port 2 (IP2) shown in FIG. 8A, and transferred to the extraction unit 201. In the extraction unit 201 shown in FIG. 8B, the OAM cell detection unit 201a detects the OAM cell based on the OAM cell discriminator D1 of the header area H, extracts the passage counter value V2 of the payload area P, and outputs this counter value V2 to the update unit 201b.

In the update unit 201b, the counter value V2 is decremented by "1", and this decremented value is transferred to the insertion unit 201c. Accordingly, the counter value V2 of the OAM cell passing through the insertion unit 201c is always decremented by "1" from the input counter value, and this decremented value is transferred to the switch unit 201d.

Further, the switch unit 201d determines whether or not the loop-back operation is performed based on the counter value updated by the update unit 201b. That is, for example, in the case of the loop-back route shown in FIG. 6, the passage counter value V2 of the OAM cell shown in FIG. 9 is determined so as to become the same value as the output designating value V1. Accordingly, when the counter value is decremented by "1" in the update unit 201b when the OAM cell passes through the loop-back unit 20-1, and the passage counter value V2 becomes "0" when the OAM cell reaches the loop-back unit 20-N. When the passage counter value V2 becomes "0", the update unit 201b generates the control signal to the switch unit 201d to switch the transmission route to the loop-back route.

As a result, in FIG. 8A, the OAM cell is transferred from the input port 2 (IP2) to the extraction unit 201, and is further transferred to the write unit 202. In the write unit 202, the loop-back point discriminator D4, which indicates passage point, is written to the payload area P so that the OAM cell is transferred to the multiplexer 11-Na through the input port 1 (IP1).

Further, the OAM cell is transferred from the multiplexer 11-Na to the VPI conversion table 12-N. In this case, when it is previously known that the OAM cell again passes through the VPI conversion table after a loop-back operation, a new output designating value V3 indicating the above operation is set to the payload P of the OAM cell. That is, as explained above, when it is previously known that the OAM cell again passes through the VPI conversion table after a loop-back operation, the new output designating value V3 denotes the output designating value determined so as to output to the insertion point of the OAM cell, and this new output designating value V3 is copied to the output designating value V1 of the header area H in the first loop-back unit.

Accordingly, the VPI conversion of the OAM cell is performed to the VPI conversion table 12-N in accordance with the new output designating value V3 so that, as shown in FIG. 6, the OAM cell is transferred to the demultiplexer 11-1b through the switch unit 13, and further transferred to the first interface 10-1 through the loop-back unit 20-1. As is obvious, the OAM cell can be returned to the same interface 20-1 into which the OAM cell is inserted FIG. 10 shows loop-back information of the OAM cell when it is extracted from the transmission port of the interface unit 10-1 shown in FIGS. 6 and 7. In this case, the new output designating value V3 which is set in the insertion step is written to the output designating value V1 of the header area H so that the new output designating value V3 is changed.

In the loop-back unit 20-1, the OAM cell is input from the demultiplexer 11-Nb to the input port 2 (IP2) shown in FIG. 8A. In the extraction unit 201 shown in FIG. 8B, since the passage counter value V2 becomes "0", the OAM cell is transferred from the switch unit 201d to the output port 2 (OP2) so that the loop-back operation is not performed in this loop-back unit 20-1. Accordingly, the OAM cell is transferred to the transmission port 10b of the same interface unit 10-1, and it is extracted therefrom. In the interface unit 10-1, the inserted OAM cell shown in FIG. 9 is compared with the extracted OAM cell shown in FIG. 10 so that it is possible to easily check an operation of the cross-connection apparatus.

FIG. 11 shows data of the OAM cell for judging failure of the cross-connection apparatus. The judgement is performed based on the following facts, and the error portion is estimated based on the result of the judgement. First, it is determined whether the OAM cell discriminator D1 indicates the OAM cell, and then it is determined whether the loop-back cell discriminator indicates the loop-back cell.

(1) Whether the insertion point discriminator D3 indicates it is own insertion point, i.e., whether this discriminator D3 is inserted from the same interface unit.

(2) For the output designating value V1 of the header area H, when the OAM cell passes through the VPI conversion table after a loop-back operation, the output designating value V1 is normally converted. Further, when the OAM cell does not pass through the VPI conversion table after loop-back operation, new output designating value V3 is set to the output designating value V1.

(3) Whether the passage counter value V2 of the payload area P of the OAM cell becomes "0".

(4) Whether the new output designating value V3 of the payload area P is changed or not.

(5) Whether the loop-back point discriminator D4 indicates the output designating value V1 which is designated in the insertion step, and further indicates the discriminator of the loop-back unit defined by the passage counter value V2.

(6) Whether the date DA for monitoring the error rate at the payload area P is changed or not.

The error portion in the apparatus is estimated when each of the above items is not satisfied as follows. That is, in the case of item (1), the error portion is estimated as the VPI conversion table 12, the switch unit 13 and the OAM cell insertion port 10a. In the case of item (2), the error portion is estimated as the VPI conversion table 12 and the loop-back point 20 and 30. In the case of item (3), the error portion is estimated as the loop-back point 20 and 30. In the case of item (5), the error portion is estimated as the VPI conversion table 12, the switch unit 13 and the OAM cell insertion port 10a. In the case of item (6), the error portion is estimated as the data error on the transmission route.

Further, in the transmission route of the OAM cell shown in FIG. 7, as shown in FIG. 8A, the OAM cell is transferred from the input port 2 (IP2) to the extraction unit 201 of the loop-back unit 30-1 through the multiplexer 11-1a (indicated by (11-1a) in FIG. 8A), and transferred to the output port 1 (OP1) through the write unit 202 (indicated by (11-1b) in FIG. 8A). Further, the OAM cell is transferred from the demultiplexer 11-1b to the interface 10-1 through the loop-back unit 20-1. Accordingly, as explained in FIG. 7, the OAM cell does not pass the VPI conversion table after the loop-back operation.

In a cross-connection apparatus according to the present invention, as explained above, a plurality of loop-back units 20-1 to 20-N and 30-1 to 30-N are provided in the apparatus, a monitor cell (i.e., OAM cell) for monitoring the function of the apparatus is periodically inserted from the interface therein, and the monitor cell has predetermined loop-back information in the payload area thereof. Further, the loop-back information is rewritten in the loop-back unit when the OAM cell passes therethrough, and the loop-back information of the inserted OAM cell is compared with that of the extracted OAM cell so that the function of the cross-connection apparatus is checked based on the above comparison. Accordingly, it is possible to easily monitor the function of the cross-connection apparatus in a B-ISDN.

We claim:

1. A cross-connection apparatus for B-ISDN (Broadband Integrated Service Digital Network), comprising:

plural interface means each having a reception port for receiving a fixed length packet or inserting a monitor cell, and a transmission port for transferring the fixed length packet or extracting the monitor cell;

plural multiplexers each operatively connected to a corresponding interface means for multiplexing the fixed length packet or the monitor cell;

plural virtual path identifier (VPI) conversion tables each operatively connected to a corresponding multiplexer for converting the VPI to change a transmission route of the fixed length packet or the monitor cell;

a switch means operatively connected to the VPI conversion tables for switching the transmission route of the fixed length packet or the monitor cell based on the VPI;

plural demultiplexers operatively connected to the switch means for demultiplexing the fixed length packet or the monitor cell and transferring these cells to the transmission port; and plural loop-back means operatively connected to corresponding interface means for changing the transmission route so as to transfer the monitor cell to the same interface means into which said monitor cell is inserted, and as a result, the apparatus being monitored by comparing the inserted monitor cell with the extracted monitor cell in the same interface means.

2. A cross-connection apparatus as claimed in claim 1, wherein said fixed length packet is an ATM (Asynchronous Transfer Mode) cell.

3. A cross-connection apparatus as claimed in claim 1, wherein said monitor cell is an OAM (Operation, Administration and Maintenance) cell comprising a header area (H) and a payload area (P), the header area including information of the VPI and the transmission route, and the payload area including loop-back information written in the insertion step and rewritten in the loop-back means.

4. A cross-connection apparatus as claimed in claim 1, wherein said loop-back means is further provided between the multiplexer and the demultiplexer so as to bypass the VPI conversion table and the switch means.

5. A cross-connection apparatus as claimed in claim 1, wherein said loop-back means comprises: four input-/output ports, i.e., two input ports (IP1 and IP2) and two output ports (OP1 and OP2); an extraction unit (201) receiving the monitor cell from the input port 2 and extracting the monitor cell to be loop-back; and write unit (202) operatively connected to the extraction unit to receive the monitor cell to be loop-backed for writing an information concerning a passage point of the monitor cell on the transmission route and outputting the information to the output port 1.

6. A cross-connection apparatus as claimed in claim 5, wherein said extraction unit comprises: a detection unit (201a) connected to the input port 2 for detecting the monitor cell and extracting counter values indicating the numbers having passed through the loop-back means, i.e., passage counter values; an update unit (201b) receiving the passage counter values to update them and generating two kinds of control signals (S1 and S2) to switch the transmission route; an insertion unit (201c) for inserting the updated passage counter values into the monitor cell based on the control signal S1; and a switch unit (201d) for switching the transmission route of the monitor cell between the output port 2 and the loop-back port based on the control signal S2.

7. A cross-connection apparatus as claimed in claim 3, wherein said header area (H) includes an OAM cell discriminator (D1) for defining the OAM cell, a loop-back cell discriminator (D2) for defining the loop-back, and an output designating value (V1) for designating an address of the interface unit outputting the OAM cell.

8. A cross-connection apparatus as claimed in claim 3, wherein said payload area (P) includes an insertion point discriminator (D3) for recording the discriminator of the insertion point; a passage counter value (V2) for designating the number of the loop-back unit i.e., loop-back point, to perform an loop-back operation; a new output designating value (V3) set so as to output to the insertion point of the OAM cell, and copied to the output designating value of the header area in the first loop-back unit; a loop-back point discriminator (D4) for indicating space to insert the discriminator of the loop-back unit which has already performed loop-back operation; and data (DA) for monitoring error rate.

* * * * *

UNITED STATES PATENT AND TRADEMARK OFFICE
CERTIFICATE OF CORRECTION

PATENT NO. : 5,265,088
DATED : November 23, 1993
INVENTOR(S) : TAKIZAWA et al.

It is certified that error appears in the above-indentified patent and that said Letters Patent is hereby corrected as shown below:

TITLE PAGE: Items

[19] Change "Takigawa et al." to --Takizawa et al.--;

[75] Inventors: Change "Yuji Takigawa" to --Yuji Takizawa--.

Signed and Sealed this

Ninth Day of May, 1995

*Attest:*

BRUCE LEHMAN

*Attesting Officer*  *Commissioner of Patents and Trademarks*